July 10, 1945.　　　I. W. DOYLE　　　2,380,034
CAMERA MAGAZINE
Filed Oct. 16, 1942　　　5 Sheets-Sheet 1

INVENTOR
Irving W. Doyle
BY
Blair, Curtis & Hayward
ATTORNEYS

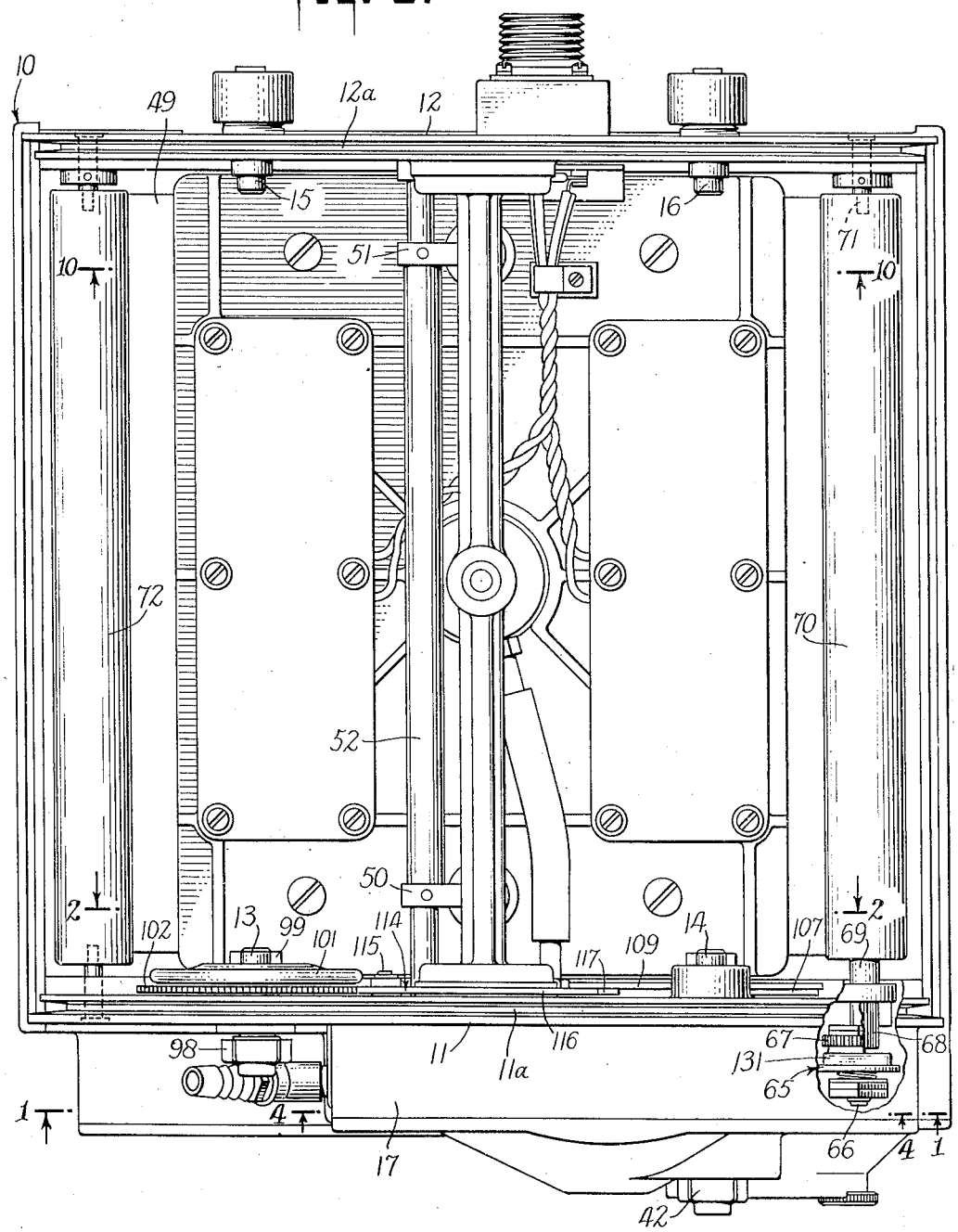

July 10, 1945.  I. W. DOYLE  2,380,034
CAMERA MAGAZINE
Filed Oct. 16, 1942  5 Sheets-Sheet 3
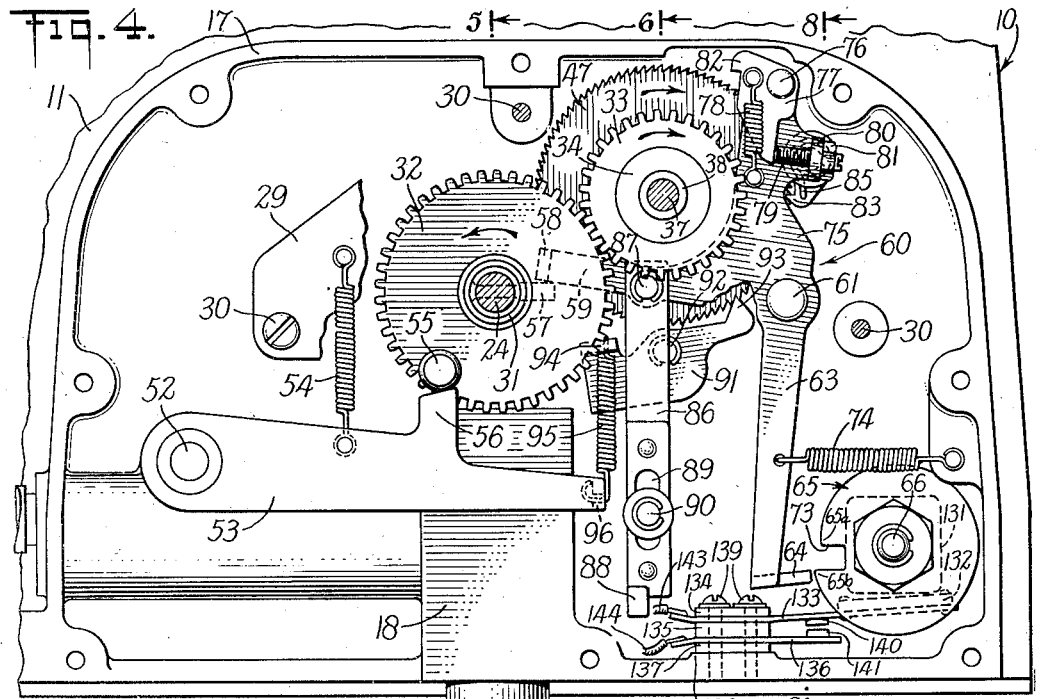
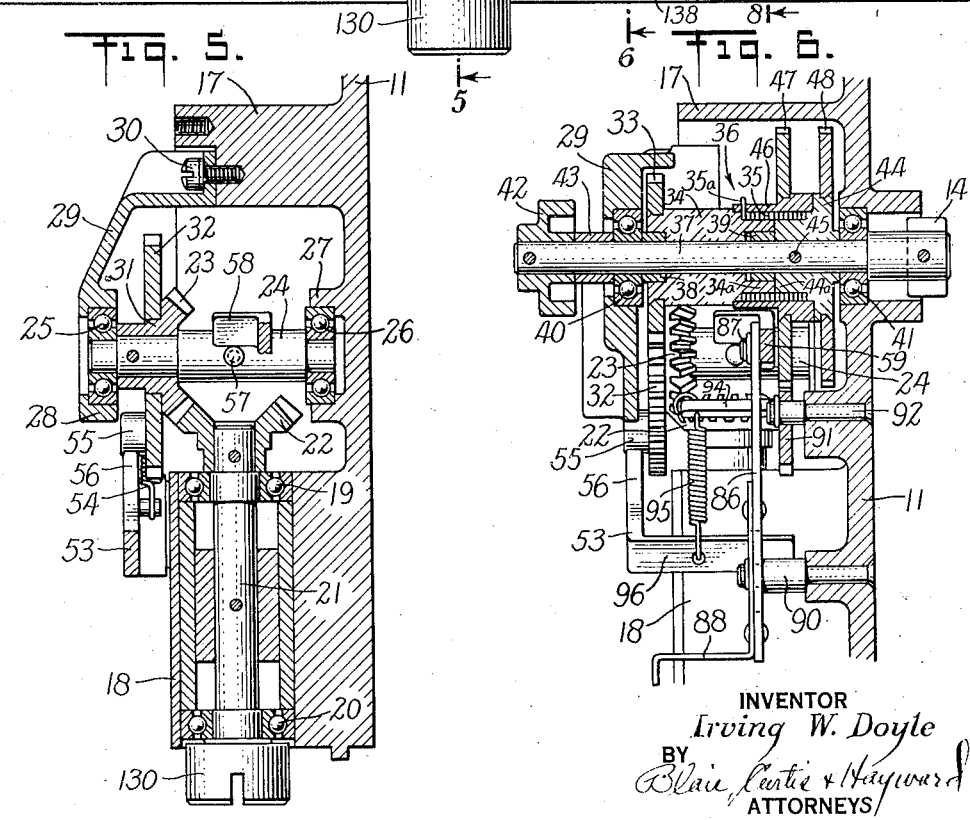
INVENTOR
Irving W. Doyle
BY
Blair, Curtis & Hayward
ATTORNEYS

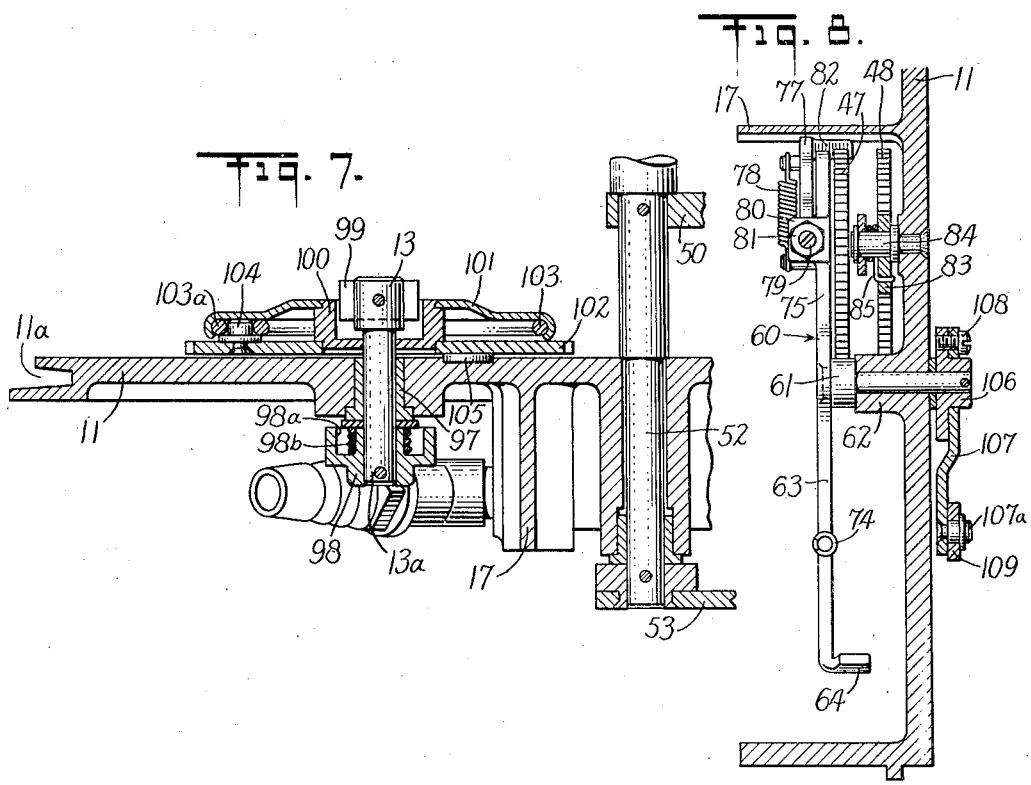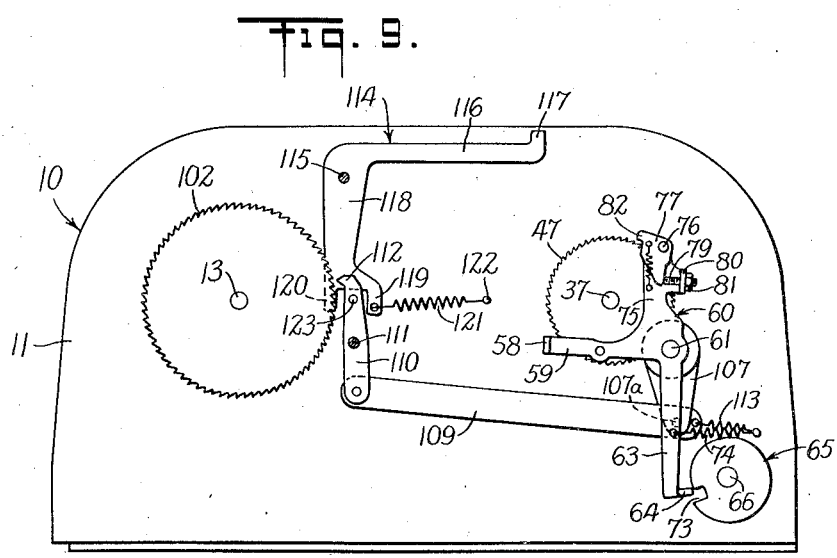

July 10, 1945.  I. W. DOYLE  2,380,034
CAMERA MAGAZINE
Filed Oct. 16, 1942  5 Sheets-Sheet 5

INVENTOR
*Irving W. Doyle*
BY
*Blair, Curtis & Hayward*
ATTORNEYS

Patented July 10, 1945

2,380,034

UNITED STATES PATENT OFFICE 2,380,034

CAMERA MAGAZINE

Irving W. Doyle, Massapequa, N. Y., assignor to Fairchild Camera and Instrument Corporation, a corporation of Delaware Application October 16, 1942, Serial No. 462,267

16 Claims. (Cl. 242—71)

This invention relates to a camera film magazine construction, and more particularly to mechanism in such a magazine for feeding unexposed film from a supply spool in metered increments.

Large mapping or military reconnaissance cameras are used to best advantage with strip film, rather than plates or cut film. A considerable length of strip film wound on a supply spool may, in contradistinction to either plates or cut film, be quickly loaded in the camera, may be rapidly fed in exact lengths to exposure position, entails less risk of fogging through handling thereof, may be easily unloaded from the camera without danger of becoming light-struck, is easily transported when out of the camera without danger of breaking or creasing, and is capable of more expeditious developing. This is particularly true in respect of large aerial cameras wherein the focal plane aperture is on the order of nine or more inches square. In the use of strip film, however, it is necessary that a correct amount of film for exposure be advanced and accurately positioned for each exposure, and that such metered feeding of the film be accomplished as rapidly as possible so as to minimize the lapse of time between exposures.

Such rapid and accurate metered feeding of the strip film has attendant difficulties, as the weight of the film on the supply spool, together with the weight of the spool itself, result in substantial inertia at the start of the feeding operation, and in substantial momentum at the end of the feeding cycle. Practical difficulties are encountered where a supply spool brake acts at all times on the supply spool to brake its rotation, as it has been found that variations in altitude adversely affect such snubbers, rendering them ineffective at one altitude, and overeffective at another. Furthermore, steady pressure of such snubbers results in a constant load on the film feeding mechanism, which not only requires the use of more power to feed the film, but also results in undue wear thereof. It is accordingly among the objects of this invention to provide a strip film feeding mechanism which is capable of rapidly feeding unexposed film in metered increments in a practical and efficient manner. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawings wherein there is shown one embodiment of the invention,

Figure 3 is a top plan view of the magazine with the top cover removed;

Figure 4 is an enlarged fragmentary sectional elevation taken along the line 4—4 of Figure 3, and showing in greater detail the feeding mechanism partially shown in Figure 1;

Figure 5 is a fragmentary sectional elevation taken along the line 5—5 of Figure 4;

Figure 6 is a fragmentary sectional elevation taken along the line 6—6 of Figure 4;

Figure 7 is a fragmentary section taken along the line 7—7 of Figure 1;

Figure 8 is a fragmentary section taken along the line 8—8 of Figure 4;

Figure 9 is a diagrammatic composite view of Figures 1 and 2 to show the timing relation of several of the elements of the feeding mechanism;

Similar reference characters refer to similar parts throughout the various views of the drawings.

Figure 1:
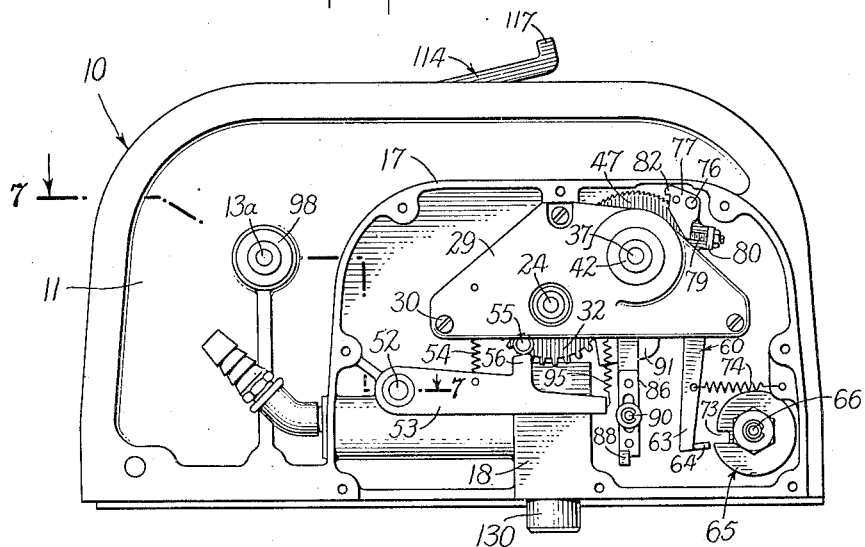
Figure 1 is an end elevation of a camera magazine in which the film feeding mechanism is installed, this view being taken substantially along the line 1—1 of Figure 3.
Figure 2:
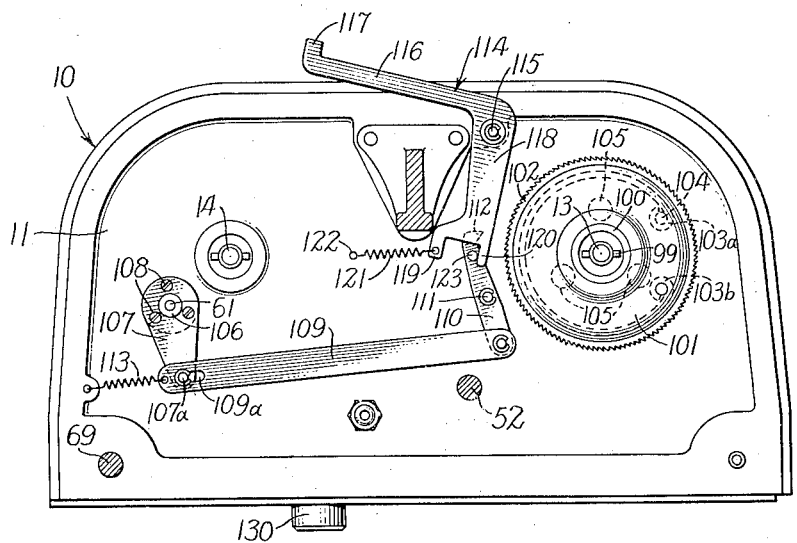
Figure 2 is a sectional elevation of the reverse side of Figure 1, and taken substantially along the line 2—2 of Figure 3.
Figure 10:
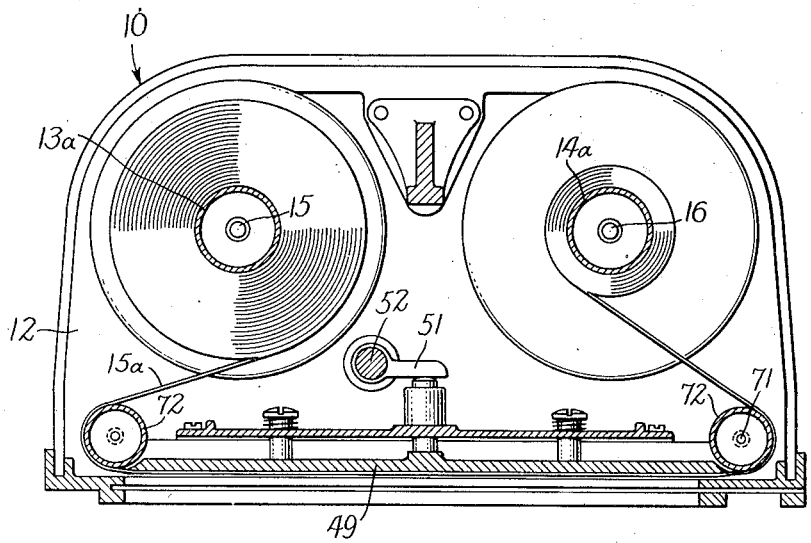
Figure 10 is a vertical section taken along the line 10—10 of Figure 3 to illustrate the manner in which the film is loaded into the magazine.

Referring first to Figures 1 and 3, the camera magazine comprises a light-tight casing, generally indicated at 10, which casing includes side plates 11 and 12 (Figure 3) respectively grooved as at 11a and 12a to receive in light-sealing relation a cover (not shown) which comprises the top and other two sides of the magazine. As shown in Figure 2, side plate 11 has rotatably mounted therein film spool spindles 13 and 14, while side plate 12 (Figure 3) is provided with respectively coaxial spindles 15 and 16. Spindles 13 and 15 (Figure 10) detachably support the film supply spool 13a which carries the supply of unexposed film 15a, while spindles 14 and 16 detachably support an exposed film spool 14a on which the film is wound subsequent to its exposure. This latter spool is driven, as will be described below, during the film winding operation to draw incremental supplies of unexposed film from the supply spool. Metered feeding of the film from one spool to the other is automatically and accurately accomplished by the mechanism shown in Figure 1, while control of the supply spool at the end of the feeding cycle is accomplished by the mechanism shown in Figure 2.

Referring back to Figure 1, magazine side plate 11 either supports or has integrally formed thereon a casing 17 which houses the film feeding mechanism. A hollow supporting column 18 may be integrally formed with the casing, and has pressed into the upper and lower ends thereof, as viewed in Figure 5, anti-friction bearings 19 and 20 which rotatably support a drive shaft 21. The lower end of drive shaft 21 is provided with a coupling 130 by which the drive shaft may be coupled either to an end crank or to a motor driven mechanism for operation of the feeding mechanism. To the upper end of shaft 21 is secured a bevel gear 22 which meshes with another bevel gear 23, secured to a cross shaft 24. The ends of this shaft 24 are respectively carried by anti-friction bearings 25 and 26, the latter of which is pressed into a boss 27 formed as an integral part of casing 17, and the former of which is pressed into a boss 28 formed in the lower portion of a bracket 29 fastened to casing 17 as by screws 30 (see also Figure 1).

As shown in Figure 5, bevel gear 23 has a hub 31, to which is secured a gear 32, which meshes with a gear 33 attached to a drum 34 (Figure 6). This latter drum carries a flat cut spring 35 of a clutch mechanism generally indicated at 36, which is engaged at the beginning of the feeding operation and disengaged at the end thereof, all as will be described in detail hereinbelow. Drum 34 is rotatably mounted on a shaft 37 by a pair of bushings 38 and 39 which are preferably pressed into opposite ends of the drum and shaft 37 is mounted in anti-friction bearings 40 and 41 carried respectively by bracket 29 and magazine side wall 11. The right-hand end of shaft 37, as viewed in Figure 6, carries spool spindle 14, while the left-hand end of the shaft carries a knurled knob 42, by which the shaft may be manually rotated when desired. Preferably a collar 43 is mounted on shaft 37 to hold knob 42 spaced from the vertical face of bracket 29.

Another drum 44 (Figure 6) is secured to shaft 37, as by a pin 45, this drum and drum 34 being provided with adjacent reduced portions 44a and 34a, respectively, which underlie a sleeve 46 to provide an annular recess within which spring 35 is disposed. The axial length of sleeve 46 exceeds the axial length of the annular recess formed by reduced ends 34a and 44a of the drums, so that the opposite ends of the sleeve are supported respectively by drums 34 and 44. One end 35a of spring 35 extends through sleeve 46, the other end being free. Sleeve 46 and drum 44, respectively, have secured thereto ratchets 47 and 48. Hence, it follows that spring end 35a is connected to ratchet 47. It should be noted at this point that spring 35 has a very close fit about the reduced ends of drums 34 and 44, so that when clutch 36 is engaged, spring 35 grips both of the drums to effect a driving connection therebetween. Thus, when the clutch is engaged, drum 44 and accordingly shaft 37 is driven, which, in turn, drives spool spindle 14 to draw film from the supply spool mounted on spindles 13 and 15 (Figure 3). Drum 34, of course, is driven from shaft 21 (Figure 5) through the train comprising bevel gears 22 and 23 and gears 32 and 33.

The camera magazine is preferably provided with a pressure plate 49 (Figures 3 and 10) which at the time of exposure of the film presses the film firmly into the focal plane. Pressure plate 49 is pressed into its film holding position by a pair of arms 50 and 51 secured to a shaft 52, one end of which extends through side plate 11 into casing 17 (Figure 4) and has attached thereto a control arm 53 which is under a constant counterclockwise bias by a spring 54, the opposite ends of which are respectively attached to the arm 53 and bracket 29. At the time of exposure the film feeding mechanism is in the position shown in Figure 4, wherein a pin 55, which is secured to gear 32, bears against a lobe 56 formed on and extending upwardly from arm 53 to force the arm downwardly against the bias of spring 54. This downward pressure is transmitted by shaft 52 to arms 50 and 51 (Figure 3) which in turn force pressure plate 49 downwardly to properly position the film in the focal plane. When, however, it is desired to feed the film gear 32 is rotated by drive shaft 21 (Figure 5) as hereinbefore described, so that pin 55 is moved away from lobe 56, thus allowing spring 54 (Figure 4) to pull arm 53 counterclockwise and hence relieve the pressure of the pressure plate on the film to permit the film to be moved. The camera magazine is also preferably provided with a vacuum system (not shown) which holds the film flat against the pressure plate during exposure. The details of construction and operation of both the pressure plate and vacuum system are shown and described in Weiblen and Doyle No. 2,131,926.

As shown in Figure 4, shaft 24 has secured thereto a pin 57 which moves upwardly from the position shown in Figure 4 when shaft 24 is driven counterclockwise, its normal feeding direction. Pin 57 is of sufficient length to engage the bottom of a lip 58 extending at right angles from one arm 59 of a bell crank generally indicated at 60, the bell crank being secured to a stud 61 journaled in a boss 62 (Figure 8) formed on magazine side 11. Lever 60 (Figure 4) also includes a downwardly extending arm 63 on the lower end of which is formed a stop 64 which coacts with a metering cam generally indicated at 65. This cam is secured to a gear 67 (Figure 3), both the cam and gear being rotatably mounted on a stationary shaft or stud 66 secured to and extending from magazine side wall 11. Gear 67 meshes with a gear 68 formed on or secured to one end of a shaft 69 which carries an idler or metering roller 70. The other end of roller 70 is rotatably supported by a stud 71 secured to magazine side 12. The specific structural details of the connection between gear 67 and cam 65 and of gear 68, shafts 69 and 71, and roller 70 are shown and described in the above-noted patent to Weiblen and Doyle. The left-hand side of the magazine, as shown in Figure 3, is also provided with an idler roller 72 rotatably supported between magazine sides 11 and 12. Thus, film fed from spool 13a (Figure 10) passes under idler 72 beneath pressure plate 49 in the focal plane of the camera, beneath metering roller 70 and onto the exposed film spool 14a. Hence, as the film is fed by the latter spool, metering roller 70 is rotated to impart rotation to metering cam 65 (Figure 3) through gears 68 and 67. It should be noted that gear 68 is smaller in diameter than gear 67 so as to provide a reduction therebetween, the reduction being proportioned so that gear 67 and accordingly cam 65 rotate but once per feed cycle.

Referring back to Figure 4, cam 65 is provided with a notch 73 into which lever stop 64 is forced at the end of the feed cycle by a spring 74, the opposite ends of which are attached respectively to the lever and to casing 17. The diameter of cam 65 at point 65a thereof may be less than at a point 65b to assure the entry of lever stop 64 into notch 73 when the cam is moving fast.

Lever 60 is provided with a third arm 75, on the upper end of which is secured a pin 76 which pivotally supports a pawl 77. Pawl 77 is biased counterclockwise by a spring 78, the upper end of which is attached to the pawl, and the lower end of which is attached to arm 75. The limit of counterclockwise movement of the pawl, is however, controlled by the setting of a set screw 79, which extends through an outwardly turned lip 80 formed on lever arm 75, the set screw being locked in position by a lock nut 81.

Pawl 77 is located adjacent to the top of ratchet 47 and is provided with a nose 82 adapted to engage the ratchet when lever 60 is rocked counterclockwise by spring 74. This movement of the lever can occur, however, only at the end of the feeding operation when the lever stop 64 enters cam notch 73 and pin 57 is clear of lip 58 on lever arm 59.

When pawl nose 82 engages ratchet 47, it forces the ratchet counterclockwise, as viewed in Figure 4, preferably through the distance of two or three teeth, and this movement of the ratchet loosens spring 35 (Figure 6) from its gripping engagement with drum 34, thus to disengage clutch 36. When lever 60 (Figure 4) is rocked clockwise, however, by the engagement of pin 57 and lip 58, pawl 77 is disengaged from ratchet 47, permitting the ratchet to rotate clockwise under the bias of spring 35 (Figure 6) thus permitting the spring to grip drum 34 and accordingly engage clutch 36. Hence, rotation of drum 34 is imparted to drum 44 and accordingly to shaft 37 to drive spool spindle 14.

When lever 60 (Figure 4) is rocked clockwise, stop 64 is withdrawn from metering cam notch 73 so that the cam can rotate as the film is fed under roller 70 (Figure 3). After pin 57 (Figure 4) has rotated counterclockwise past lever lip 58, lever 60 then rocks a short distance counterclockwise under the bias of spring 74, this movement of the lever, however, being limited by the engagement of lever stop 64 with the periphery of metering cam 65; the lever stop thus rides over the periphery of the cam as it rotates, until notch 73 is again in a position to receive stop 64. When this occurs, clutch 36 is disengaged and the end of the feeding cycle has been reached. Thus the correct amount of film is accurately wound on the exposed film spool.

Preferably I provide a spring-actuated pawl 83 (Figure 8) which engages ratchet 48 (Figure 6) to prevent unwinding of the exposed film spool on spindle 14 upon completion of the feeding operation. This pawl 83 (Figure 8) may be mounted on a stud 84 carried by the magazine side plate 11 and is forced into ratcheting position by a spring 85.

As shown in Figure 4, I preferably provide a vertically extending link 86, the upper end of which is pivotally connected to lever 60 as by a pin 87, and the lower end of which is provided with an arm 88 (see also Figure 6) which actuates a counting mechanism (not shown). Link 86 (Figure 4) is slotted as at 89 and through this slot extends a guide pin 90 (Figure 6) which guides the link as it reciprocates.

I also prefer to provide a second clutch disengaging pawl 91 (Figure 4) which is pivotally mounted on a pin 92 and has a tooth 93 (Figure 4) adapted to engage ratchet 47. Pawl 91 is provided with a lip 94 to which one end of a tension spring 95 is connected. The lower end of spring 95 (Figure 6) is secured to transverse arm 96, which is formed on the end of lever 53 and extends at right angles therefrom a sufficient distance so that the free end of the arm underlies the bottom of pawl 91. Hence, the various parts of the mechanism are in the position shown in Figure 4; arm 53 by virtue of spring 95 forces pawl 91 into engagement with ratchet 47 thus maintaining the clutch disengaged. When, however, pin 55 on gear 32 has passed lobe 56 on lever 53 so that the arm can rock counterclockwise, its arm 96 rises until its free end engages the bottom of pawl 91, forcing the pawl out of engagement with ratchet 47 to permit engagement of clutch 36 (Figure 6). Through the provision of pawl 91, disengagement of the clutch at the end of the feeding cycle is assured in the event that pawl 77 fails to engage ratchet 47 to disengage the clutch.

As noted hereinabove, the film supply spool 13a (Figure 10), when loaded in the camera, contains a substantial amount of film which, being of substantial width, has considerable weight. When a length of film is fed from the supply spool, the spool builds up substantial momentum, and unless this momentum is absorbed at the end of the feeding cycle, the spool will continue to rotate and additional film will be unwound therefrom to form a loop in the camera magazine which might well jam the mechanisms therein or become scratched or torn. Accordingly, as shown in Figure 2, I have provided a mechanism for braking the film supply spool which is mounted at one end on spindle 13. This spindle, as shown in Figure 7, is journaled in a bushing 97 carried in magazine side 11. The outer end 13a of the spindle 13 has a knob 98 secured thereto so that the spindle may be manually rotated. The inner end of spindle 13 is provided with a key 99 which interfits with a keyway formed in a hub 100 to which is fastened a disc 101. Hub 100 rotatably supports a ratchet 102 and this ratchet and disc 101 are interconnected by a strong spring 103, one end 103a of the spring being fastened to the ratchet by a pin 104, and the other end 103b of the spring (Figure 2) being fastened to disc 101. Thus, referring back to Figure 7, it may be seen that disc 101 and ratchet 102 are capable of relative rotation, but only to the extent permitted by the tension of spring 103. Thus, the disc and ratchet are resiliently connected. Preferably, I secure a number of pads 105 to magazine side 11, and these pads may be made of any suitable material and impregnated with a lubricant, if desired, to support ratchet 102 in spaced relation to the inner side of magazine side 11. Knob 98 has a recess 98a in which is disposed a coiled spring 98b which forces ratchet 102 against pads 105.

As shown in Figure 8, stud 61, which carries lever 60 on one end, has secured to its other end a flanged collar 106. This collar, in turn, carries an arm 107 which is secured to the collar flange by a plurality of screws 108 which extend through slots in the arm and are threaded into the collar flange so that the arm may be adjusted angularly with relation to the collar for a purpose to be described hereinbelow. The lower end of arm 107 (Figure 2) carries a pin 107a which extends through a slot 109a in a link 109 to pivotally secure the lever to the link. The pin and slot thus provide a lost motion connection between the arm and link for a purpose to be described. The other end of link 109 is pivotally connected to the lower end of a pawl 110 pivotally mounted on a pin 111 carried by magazine side 11. The upper end of pawl 110 is provided with a detent 112 which is adapted to engage ratchet 102 when the pawl is pivoted clockwise, as viewed in Figure 2. Preferably the left-hand end of link 109 is connected to one end of a spring 113, the other end of which is fastened to the magazine side 11, and this spring constantly pulls link 109 to the left to impart a clockwise bias to pawl 110 so as to maintain the ratchet and pawl against inadvertent disengagement.

Inasmuch as arm 107 is fastened to shaft 61, it will rock clockwise to engage the ratchet and pawl when lever 60 rocks counterclockwise, as viewed in Figure 4, to effect engagement between pawl 77 and ratchet 47 to disengage clutch mechanism 36 (Figure 6). It accordingly follows that at the end of the feed cycle, when the clutch is disengaged, ratchet 102 (Figure 2) is brought to an abrupt halt by pawl 110 so that further rotation of spindle 13, by reason of the momentum of the film supply spool, is limited by the tension of spring 103 which rapidly absorbs the momentum of the film spool, bringing it to a quick but not jarring halt. In other words, the film spool is sufficiently snubbed at the end of the feed cycle, without, however, being brought to such a sudden stop as might damage any of the mechanism. As noted above, there is a lost motion connection between arm 107 and link 109. This type of connection is provided so that arm 107 and accordingly metering arm 60 (Figure 4) which are interconnected may complete their total movement in the event pawl 112 should engage the top of a tooth on ratchet 102 so as to assure disengagement of clutch 36 (Figure 6) by the metering arm.

To preclude engagement between ratchet 102 (Figure 2) and pawl 110, while the cover is off the camera magazine, I have provided a lever 114, pivotally mounted on a pin 115 secured to magazine side 11, this lever having a generally transversely extending arm 116 provided with an upturned lip 117, and a generally depending arm 118, provided with bifurcations 119 and 120. Lever 114 is biased clockwise, as viewed in Figure 2, by a spring 121, one end of which is connected to bifurcation 119, and the other end of which is connected to a pin 122 fastened to magazine side 11. When the magazine cover is off, the lever 114 is rocked to the position shown in Figure 2 by spring 121 which forces bifurcation 120 against a pin 123 carried by pawl 110, thus holding the pawl out of engagement with ratchet 102. When, however, the cover is placed on the camera magazine, it engages lip 117 of lever 114, rocking the lever counterclockwise and moving bifurcation 120 away from pin 123 so that pawl 110 may be pivoted clockwise into engagement with ratchet 102 as described above.

In many instances the camera is located in the airplane remotely from the pilot or whomever is charged with the operation of the camera. Under such circumstances, it is of importance for the camera operator to be able to determine at a glance and at any time whether or not the film is feeding. To this end, the camera is provided with an indicator from which the operator can immediately determine whether or not the film has ceased to feed for one reason or another.

As shown in Figure 4, the metering cam shaft 66 has a square cam 131 mounted thereon between cam 65 and gear 67 (Figure 3). The corners of this cam are adapted, when the cam rotates, to engage a block 132 fastened to the free end of a leaf spring 133, the other end of which is clamped between a pair of insulating blocks 134 and 135. A second leaf spring 136 is clamped between insulating block 135 and another insulating block 137, all of these blocks being fastened securely to a boss 138 formed on the magazine base by a pair of screws 139 which extend through the blocks and are threaded into the boss. Screws 139 are insulated from leaf spring 133 and 136 so as not to form any electrical connection therebetween.

A pair of contacts 140 and 141 are respectively secured to leaf springs 133 and 136 so that an electrical connection is formed between the leaf springs when the contacts engage. It will now appear that upon rotation of cam 131 its corners successively engage block 132 and accordingly depress spring 133 to engage contact 140 with contact 141. This engagement of the contacts establishes a circuit to be described.

Figure 11:
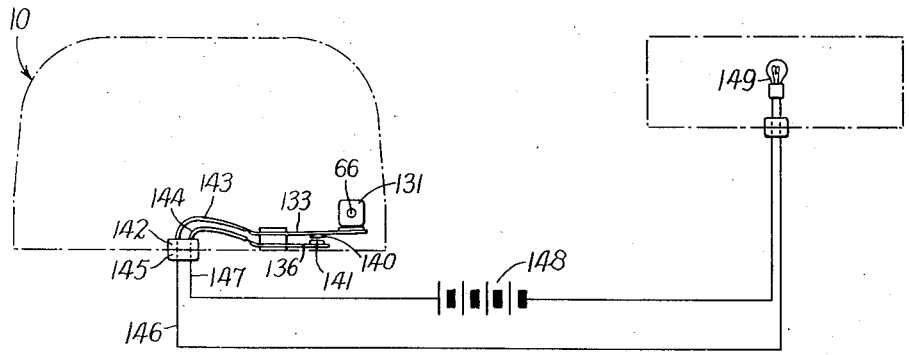
Figure 11 is a schematic wiring diagram of the film feed indicator.

As shown in Figure 11, the magazine casing 10 has a socket 142 secured in its side and this socket is connected by leads 143 and 144 to leaf springs 133 and 136, respectively. Socket 142 is adapted to receive a block 145 from which extend leads 146 and 147. The former of these leads is connected through a battery or other source of current 148 to one side of a lamp 149 mounted in the instrument panel in the airplane cockpit, while the latter of the leads is connected to the other side of the lamp. It may accordingly be seen that, when one corner of square cam 131 closes contacts 140 and 141, the circuit to lamp 149 is established.

Inasmuch as the metering cam shaft 66 rotates completely for each cycle, square cam 131 also rotates once, thus causing four successive engagements between contacts 140 and 141, thus blinking lamp 149 four times. This blinking of the lamp indicates to the camera operator that film is being properly fed past metering roller 70 (Figure 3). If, however, the film becomes exhausted or breaks, roller 70 will no longer be rotated and hence rotation of square cam 131 (Figure 4) will cease. If the square cam thus ceases to rotate, bulb 149 (Figure 11) remains either on or off and will not flash, thus indicating to the operator that the film has become exhausted or broken.

From the above, the over-all operation of the camera magazine will appear. Thus, with reference to Figure 4, drive shaft 21 (Figure 5) is rotated by motor or by hand to rotate gear 32 (Figure 4) counterclockwise. As the gear rotates, its pin 55 rides over lever lobe 56, which releases the pressure of pressure plate 49 (Figure 3) on the film so that the film can be fed across the focal plane. Continued rotation of gear 32 (Figure 4) causes pin 57 to engage under lever lip 58, and as the pin rotates, lever 60 is rocked clockwise to disengage pawl 77 from ratchet 47, permitting the clutch 36 (Figure 6) to engage. At the same time, lever stop 64 (Figure 4) is withdrawn from metering cam notch 73 to permit the cam to rotate as the film is fed under roller 70 (Figure 3). Also, as arm 60 is rocked clockwise, similar movement is imparted to stud 61 which rocks lever 106 (Figure 2) counterclockwise to pivot pawl 110 counterclockwise out of engagement with ratchet 102 to permit the film to be fed from the supply spool.

The film is fed causing roller 70 (Figure 3) to rotate, and in turn causing meter cam 65 (Figure 4) to rotate. During rotation of the cam, lever stop 64 rides on its periphery until notch 73 has rotated through 360°, whereupon stop 64 reenters the notch under the bias of spring 74 during the counterclockwise movement of lever 60. This movement of the lever forces pawl 77 into engagement with ratchet 47, moving the ratchet slightly counterclockwise to immediately disengage clutch 36 (Figure 6). Also at this portion of the cycle, pin 55 (Figure 4) on gear 32 engages lobe 56, forcing lever 53 downwardly to clamp the film in place. Also, this downward movement of the lever rocks pawl 91 counterclockwise, as viewed in Figure 4, to engage its detent 93 with ratchet 47, thus securely locking clutch 36 (Figure 6) in disengaged position. The counterclockwise movement of crank 60 (Figure 4) also rocks stud 61 counterclockwise, causing clockwise movement of arm 107, as viewed in Figure 2. This movement of the arm rocks pawl 110 clockwise, causing it to engage ratchet 102 to lock spindle 13 and accordingly the film supply spool against further rotation, the momentum of the spool being stopped by spring 103 as described hereinbefore.

In Figure 9 I have shown a composite view of various of the operating levers mounted on the inner and outer sides of magazine side 11, this view being illustrative of the adjustment of the various levers to properly time them. In timing the magazine, the metering cam 65 is rotated to the position shown. The pawl release lever 114 is then pressed all the way down and held in this position until all adjustments have been made. With the arm thus held down, the metering arm pawl 77 is adjusted by means of the set screw 79 to obtain the proper clearance between the pawl and ratchet 47. This clearance is desirably on the order of .010" to .015". When properly adjusted, the set screw 79 is locked in place by lock nut 81. Thereafter, the three screws 108, which extend through the slots in collar 106, are loosened and the arm 107 is adjusted until the proper clearance is obtained between the pawl 110 and ratchet 102. After this clearance has been established, arm 107 is locked in position by tightening up screws 108. When these adjustments have been made, the metering arm pawl 77 engages a tooth on ratchet 47 just before pawl 110 engages a tooth on ratchet 102. This action occurs when notch 73 in the metering cam 65 is in position to permit the entry therein of stop 64 in the metering lever 60. Thus, the mechanism effectively stops the feed of film after the proper amount has been fed and positioned, and just before the brake is applied to the film supply spool.

It will also appear that lever 60, under the control of metering cam 65, rapidly declutches the feeding mechanism and accordingly eases the tension on the drive, which would otherwise result from the drive pulling against the heavy spring 103 (Figure 2) in the film supply spool brake.

I have accordingly provided a film feeding mechanism for a camera magazine which attains the several objects hereinabove set forth in a thoroughly practical and efficient manner.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a camera, in combination, a film supply spool, an exposed film spool adapted to have wound thereon film subsequent to exposure, means for driving the latter spool to wind film thereon after exposure, said means including a clutch, brake means for stopping rotation of the first spool subsequent to the winding operation, means for disengaging said clutch and means operated by said clutch disengaging means for setting said brake means after said clutch is disengaged.

2. In a camera, in combination, a film supply spool, an exposed film spool adapted to have wound thereon film after exposure, means for driving the latter spool to wind film thereon after exposure, means for limiting the operation of said driving means to limit the amount of film wound thereon, said driving means including a clutch, brake means including a pawl and ratchet for stopping rotation of the first spool subsequent to the winding operation, means for disengaging said clutch, and means operated by said clutch disengaging means for engaging said pawl and ratchet to set said brake means after said clutch is disengaged.

3. In a detachable magazine for an aerial camera or the like, in combination, a film supply spool rotatably mounted in said magazine, an exposed film spool rotatably mounted in said magazine and adapted to have film wound thereon after exposure, a cover detachably mounted on said magazine and removable therefrom to permit access therewithin, brake means for holding said film supply spool against rotation, said brake means being normally set when the film is in exposure position, and means controlled by the position of said magazine cover and operable upon removal of the cover from the magazine for releasing said brake means.

4. In a detachable magazine for an aerial camera or the like, in combination, a film supply spool, an exposed film spool adapted to have film fed thereon after exposure, said spools being rotatably mounted in said magazine, a ratchet connected to said supply spool, a pawl pivotally mounted in said magazine and engageable with said ratchet to prevent rotation of said supply spool, a cover detachably secured to said magazine and removable therefrom to permit access therein, and a spring-biased arm pivotally mounted in said magazine in engagement with said pawl for urging said pawl out of engagement with said ratchet, said arm including a portion which is engaged by said cover when the cover is on the magazine to hold said arm out of engagement with said pawl.

5. In a camera, in combination, a film supply spool, an exposed film spool adapted to have exposed film wound thereon, means for driving the latter spool to wind film thereon after exposure, a ratchet connected to said supply spool, a pawl pivotable into and out of engagement with said ratchet, and means controlled by the movement of the film to effect engagement of said pawl with said ratchet at the end of the winding cycle.

6. In a camera, in combination, a film supply spool, an exposed film spool adapted to have exposed film wound thereon, means for driving the latter spool to wind film thereon after exposure, a ratchet connected to said supply spool, a pawl pivotable into and out of engagement with said ratchet, means controlled by the movement of the film to effect engagement of said pawl with said ratchet at the end of the winding cycle, and means forming a resilient connection between said ratchet and said supply spool.

7. A camera magazine comprising, in combination, a film supply spool, a film take-up spool, means for driving said take-up spool to wind film thereon after exposure, a clutch connecting said driving means and said take-up spool, a lever movable between clutch engaging and disengaging positions for controlling said clutch, means forming an operative connection between said driving means and said lever whereby said lever is moved into its clutch engaging position at the beginning of the operative cycle of said driving means, a brake for stopping rotation of said supply spool at the end of the film winding cycle, a lever for setting said brake, and means forming an operative connection between said levers effective at the end of the winding cycle for setting said brake after said clutch is disengaged.

8. Apparatus according to claim 7 wherein the supply spool brake includes a ratchet and a pawl on the end of said second lever for engaging said ratchet to stop rotation of said supply spool when the brake is set.

9. Apparatus according to claim 7 wherein the camera magazine is provided with a cover, and means responsive to the removal of said cover for releasing said brake.

10. Apparatus according to claim 7 wherein the camera magazine is provided with a cover, and means responsive to the removal of said cover for releasing said brake regardless of the operative condition of said clutch.

11. A camera magazine comprising, in combination, a film supply spool, a film take-up spool, means including a clutch for driving said take-up spool, a metering roller engaged by said film and adapted to be rotated thereby during the winding operation, means including a lever movable between clutch engaging and disengaging positions to control said clutch, a cam connected to said metering roller, said lever including a portion engaging said cam, a spring for holding said lever portion in engagement with said cam, a brake, means including a lever for operating said brake, and a link connecting said first and second levers, said levers being so arranged that said first lever moves into clutch disengaging position before said second lever moves into brake setting position.

12. A camera magazine comprising, in combination, a film supply spool, a film take-up spool, means including a clutch for driving said take-up spool to wind film thereon after exposure, a lever movable between clutch engaging and disengaging positions for controlling said clutch, means operated by said driving means for moving said lever into clutch engaging position, a second lever connected to said first lever and movable therewith, a brake for stopping rotation of said supply spool at the end of the film winding cycle, a link connected to said brake, and means forming a lost motion connection between said link and said second-mentioned lever whereby said brake is operated between movement of said levers.

13. Apparatus according to claim 1 wherein said brake means comprises a ratchet and pawl.

14. Apparatus according to claim 1 wherein said brake means comprises a ratchet and pawl, and means forming a resilient connection between said ratchet and said supply spool.

15. A camera magazine comprising, in combination, a film supply spool, a film take-up spool, means including a clutch for driving said take-up spool to wind film thereon after exposure, a lever movable between clutch engaging and disengaging positions for controlling said clutch, means operated by said driving means for moving said lever into clutch engaging position, a second lever connected to said first lever and movable therewith, a brake for stopping rotation of said supply spool at the end of the film winding cycle, a link connected to said brake, means forming a lost motion connection between said link and said second-mentioned lever whereby said brake is operated between movement of said levers, and spring means constantly biasing said pawl toward its ratchet engaging position.

16. Apparatus according to claim 12 wherein said brake includes a ratchet attached to said supply spool, a pawl pivotally mounted in said magazine and pivotable into engagement with said ratchet, and means connecting said link and said pawl.

IRVING W. DOYLE.